US009624105B1

(12) United States Patent
Sicinski et al.

(10) Patent No.: US 9,624,105 B1
(45) Date of Patent: Apr. 18, 2017

(54) PROCESS FOR PRODUCING HYDROGEN WITH REDUCED CORROSION

(71) Applicant: AIR PRODUCTS AND CHEMICALS, INC., Allentown, PA (US)

(72) Inventors: Michael Andrew Sicinski, Orefield, PA (US); David Ross Graham, Harleysville, PA (US); Kelly Ann Forester, Harleysville, PA (US); Candice Daibes Silvestre, Quakertown, PA (US); Gerald Michael Loughney, Collegeville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 14/950,044

(22) Filed: Nov. 24, 2015

(51) Int. Cl.
| | |
|---|---|
| *C01B 3/38* | (2006.01) |
| *B01D 53/04* | (2006.01) |
| *C01B 3/56* | (2006.01) |
| *B01D 53/047* | (2006.01) |
| *B01D 53/26* | (2006.01) |
| *B01J 7/02* | (2006.01) |
| *B01J 19/00* | (2006.01) |

(52) U.S. Cl.
CPC .............. *C01B 3/38* (2013.01); *B01D 53/047* (2013.01); *B01D 53/0438* (2013.01); *B01D 53/263* (2013.01); *B01D 53/265* (2013.01); *B01J 7/02* (2013.01); *B01J 19/0013* (2013.01); *C01B 3/56* (2013.01); *B01D 2256/16* (2013.01); *B01J 2219/0015* (2013.01); *B01J 2219/00074* (2013.01); *C01B 2203/0233* (2013.01); *C01B 2203/042* (2013.01); *C01B 2203/0833* (2013.01); *C01B 2203/1241* (2013.01)

(58) Field of Classification Search
CPC    B01D 53/0438; B01D 53/047; B01D 53/263; B01D 53/265; B01D 2256/16; C01B 3/38; C01B 3/56; C01B 2203/0233; C01B 2203/042; C01B 2203/0833; C01B 2203/1241; B01J 7/02; B01J 19/0013; B01J 2219/00074; B01J 2219/0015
USPC .......................... 95/114, 115, 90, 96; 96/121
See application file for complete search history.

(56) References Cited

U.S. PATENT DOCUMENTS

| | | | |
|---|---|---|---|
| 9,458,013 B1* | 10/2016 | Sicinski | .................... C01B 3/38 |
| 2003/0110693 A1* | 6/2003 | Drnevich | ................. C01B 3/382 48/197 R |
| 2012/0039794 A1* | 2/2012 | Catchpole | ............... C01B 3/382 423/653 |

FOREIGN PATENT DOCUMENTS

EP            2103569 A2     9/2009

OTHER PUBLICATIONS

Debruyn, H. J., "On-Line Monitoring Using Electrochemical Noise Measurement in CO—CO2—H2O Systems," ASTM International, 1996, pp. 214-229.

(Continued)

*Primary Examiner* — Frank Lawrence
(74) *Attorney, Agent, or Firm* — Bryan C. Hoke, Jr.

(57) ABSTRACT

Process for producing a hydrogen-containing product gas while impeding corrosion of piping operatively connecting a condensate separator and a pressure swing adsorption unit by heating the effluent gas stream from the condensate separator well above the dew point of the effluent gas stream to prevent liquid water in the stream. Heating of the effluent gas stream is provided without deteriorating the energy efficiency of the process.

20 Claims, 2 Drawing Sheets

(56) References Cited

OTHER PUBLICATIONS

Haussinger, Peter, et al., "Hydrogen, 3. Purification", Ullmann's Encyclopedia of Industrial Chemistry, Oct. 15, 2011, Wiley-VCH Verlag GmbH & Co. KGFaA, Weinheim, Germany, XP055070696, pp. 309-333.

* cited by examiner

PROCESS FOR PRODUCING HYDROGEN WITH REDUCED CORROSION

BACKGROUND

Hydrogen production facilities are known to have process piping corrosion issues due to $CO_2$ stress-assisted corrosion and $H_2$ embrittlement. It is known in the industry to relieve the residual weld stress by a process called post weld heat treatment.

One particularly vulnerable area of piping is the piping connecting the reformate knock-out drum and the pressure swing adsorption unit.

Industry desires to prevent corrosion of process piping in hydrogen production facilities.

Industry desires hydrogen production processes with high energy efficiency.

BRIEF SUMMARY

The present invention relates to a process and apparatus for producing a hydrogen-containing product gas. The present process and apparatus are particularly suited to impede corrosion of piping that connects a condensate separator and a pressure swing adsorption unit.

There are several aspects of the invention as outlined below. In the following, specific aspects of the invention are outlined below. The reference numbers and expressions set in parentheses are referring to an example embodiment explained further below with reference to the figures. The reference numbers and expressions are, however, only illustrative and do not limit the aspect to any specific component or feature of the example embodiment. The aspects can be formulated as claims in which the reference numbers and expressions set in parentheses are omitted or replaced by others as appropriate.

Aspect 1. A process for producing a hydrogen-containing product gas (30) while impeding corrosion of piping (357) operatively connecting a separator (321) and a pressure swing adsorption unit (501), the process comprising:
  passing a reformate (25) from a shift reactor (303) to the separator (321) via a plurality of heat exchangers, the plurality of heat exchangers operatively disposed between the shift reactor (303) and the separator (321), thereby condensing water in the reformate (25) to form a water condensate (240) and a water-depleted reformate (29) in the separator (321);
  withdrawing the water condensate (240) from the separator (321);
  withdrawing the water-depleted reformate (29) from the separator (321) (severally from the water condensate);
  heating the water-depleted reformate (29) withdrawn from the separator (321); and
  passing at least a portion of the water-depleted reformate (29) that was heated to the pressure swing adsorption unit (501) to form the hydrogen-containing product gas (30) and a by-product gas (82) from the at least a portion of the water-depleted reformate.

Aspect 2. The process of aspect 1 wherein the water-depleted reformate (29) withdrawn from the separator (321) is heated to at least 3 degrees Celsius or at least 5 degrees Celsius above the dewpoint temperature of the water-depleted reformate (29).

Aspect 3. The process of aspect 1 or aspect 2 further comprising thermally insulating at least a portion of the piping operatively connecting the separator and the pressure swing adsorption unit with a thermal insulation.

Aspect 4. The process of aspect 3 wherein the thermal insulation is configured such that the water-depleted reformate reaches the pressure swing adsorption unit at a temperature above the dewpoint temperature of the water-depleted reformate.

Aspect 5. The process of any one of aspects 1 to 4 wherein the water-depleted reformate (29) is heated in a first heat exchanger (322) by indirect heat transfer with a feed (347) to the first heat exchanger (322) comprising boiler feed water, steam, or a mixture thereof.

Aspect 6. The process of aspect 5 further comprising:
  withdrawing an effluent (349) from the first heat exchanger (322), the effluent (349) formed from the feed (347) to the first heat exchanger, and
  passing the effluent (349) from the first heat exchanger (322) to a deaerator (711).

Aspect 7. The process of aspect 5 or aspect 6 further comprising:
  heating a feed (376) to a second heat exchanger (318, 320) by indirect heat transfer with the reformate (25), wherein the plurality of heat exchangers comprise the second heat exchanger (318, 320); and
  withdrawing an effluent (377) from the second heat exchanger (318, 320), the effluent (377) from the second heat exchanger (318, 320) formed from the feed (376) to the second heat exchanger (318, 320), wherein the feed (347) to the first heat exchanger (322) comprises at least a portion of the effluent (377) from the second heat exchanger (318, 320).

Aspect 8. The process of claim 7 further comprising:
  passing a second portion (348) of the effluent from the second heat exchanger (318, 320) to the deaerator (711) wherein the second portion (348) bypasses the first heat exchanger (322).

Aspect 9. The process of aspect 7 or aspect 8 wherein the second heat exchanger (318) is a low pressure boiler and the effluent (377) from the second heat exchanger (318) is steam having a pressure ranging from 180 kPa (absolute) to 400 kPa (absolute).

Aspect 10. The process of any one of aspects 3 to 9 wherein the feed (347) to the first heat exchanger (322) is steam having a pressure ranging from 180 kPa (absolute) to 400 kPa (absolute).

Aspect 11. The process of any one of the preceding aspects wherein the feed (376) to the second heat exchanger (318) of aspect 6 comprises a portion of a deaerated water effluent (245) from the deaerator (711) of aspect 5.

Aspect 12. The process of aspect 7 or aspect 8 or aspect 10 wherein the feed (376) to the second heat exchanger (320) comprises one or more of (i) at least a portion of a water effluent (215) from a heat exchanger (214) for heating combustion air (99), (ii) at least a portion of a water effluent (516) from a heat exchanger (515) for heating the by-product gas (82) from the pressure swing adsorption unit (501), and (iii) at least a portion (241) of the water condensate (240) from the separator (321).

Aspect 13. The process of aspect 7 or aspect 8 or aspect 10 wherein the feed (376) to the second heat exchanger (320) comprises (i) a water effluent (215) from a heat exchanger (214) for heating combustion air (99), (ii) a water effluent (516) from a heat exchanger (515) for heating the by-product gas (82) from the pressure swing adsorption unit (501), and (iii) at least a portion (241) of the water condensate (240) from the separator (321).

Aspect 14. The process of any one of aspects 7 to 13 further comprising:

heating imported water (make-up water) (400) in a third heat exchanger (316) by indirect heat transfer with the reformate (25), wherein the plurality of heat exchangers comprise the third heat exchanger (316), and wherein the reformate (25) heats the feed (376) to the second heat exchanger (320) in the second heat exchanger (320) before the reformate (25) heats the imported water (400) in the third heat exchanger (316).

Aspect 15. The process of aspect 14 including aspect 6 further comprising:

passing the imported water (400) from the third heat exchanger (316) to the deaerator (711).

Aspect 16. The process of aspect 14 or aspect 15 further comprising:

heating a hydrocarbon feedstock (75) in a fourth heat exchanger (311) by indirect heat transfer with the reformate (25), wherein the plurality of heat exchangers comprise the fourth heat exchanger (311), and wherein the reformate (25) heats the hydrocarbon feedstock (75) in the fourth heat exchanger (311) before the reformate (25) heats the feed (376) to the second heat exchanger (320) in the second heat exchanger (320).

Aspect 17. The process of aspect 16 further comprising:

heating a steam drum feed (220) comprising a portion of a deaerated water effluent (245) from the deaerator (711) in a fifth heat exchanger (314) by indirect heat transfer with the reformate (25), wherein the plurality of heat exchangers comprise the fifth heat exchanger (314), and wherein the reformate heats the stream drum feed (220) in the fifth heat exchanger (314) after the reformate heats the hydrocarbon feedstock (75) in the fourth heat exchanger (311) and before the reformate heats the feed (376) to the second heat exchanger (320) in the second heat exchanger (320); and passing the heated steam drum feed (220) to a steam drum (712).

Aspect 18. The process of aspect 17 further comprising:

heating the steam drum feed (220) in a sixth heat exchanger (315) by indirect heat transfer with the reformate (25), wherein the reformate heats the stream drum feed (220) in the sixth heat exchanger (315) before the reformate is passed to the shift reactor (303), and wherein the steam drum feed (220) is heated in the fifth heat exchanger (314) before the steam drum feed (220) is heated in the sixth heat exchanger (315).

Aspect 19. The process of aspect 17 or aspect 18 further comprising:

heating a hydrocarbon feedstock (75) in a seventh heat exchanger (312) by indirect heat transfer with the reformate (25), wherein the plurality of heat exchangers comprise the seventh heat exchanger, wherein the reformate (25) heats the hydrocarbon feedstock (75) in the seventh heat exchanger (312) after the reformate (25) heats the portion of the deaerated water effluent (245) in the fifth heat exchanger (314) and before the reformate (25) heats the feed (376) to the second heat exchanger (320) in the second heat exchanger (320), and/or wherein the hydrocarbon feedstock (75) is heated in the seventh heat exchanger (312) before the hydrocarbon feedstock (75) is heated in the fourth heat exchanger (311).

Aspect 20. The process of any one of the preceding aspects wherein the at least a portion of the water-depleted reformate (29) passed to the pressure swing adsorption unit (501) is separated by adsorption in the pressure swing adsorption unit (501) to form the hydrogen-containing product gas (30) and the by-product gas (82).

Aspect 21. An apparatus for producing a hydrogen-containing product gas (30) while impeding corrosion of piping (357) operatively connecting a separator (321) and a pressure swing adsorption unit (501), the apparatus comprising:

a shift reactor (303) having an inlet for receiving a reformate (25) and an outlet for discharging the reformate (25) after reacting in the shift reactor (303);

the separator (321) having an inlet operatively disposed to receive the reformate from the shift reactor, an outlet for discharging a water-depleted reformate (29), and an outlet for discharging a water condensate (240);

a plurality of heat exchangers operatively disposed between the shift reactor (303) and the separator (321);

the pressure swing adsorption unit (501) having an inlet operatively disposed to receive the water-depleted reformate (29) from the separator (321), an outlet for discharging the hydrogen-containing product gas (30), and an outlet for discharging a by-product gas (82); and a first heat exchanger (322) operatively disposed between the separator (321) and the pressure swing adsorption unit (501) for heating the water-depleted reformate (29) by indirect heat transfer with a feed (347) to the first heat exchanger (322).

Aspect 22. The apparatus of aspect 21 wherein at least a portion of the piping (357) operatively connecting the separator (321) and the pressure swing adsorption unit (501) is thermally insulated with a thermal insulation.

Aspect 23. The apparatus of aspect 22 wherein the thermal insulation is configured such that the water-depleted reformate (29) reaches the pressure swing adsorption unit (501) at temperature above the dewpoint temperature of the water-depleted reformate (29).

Aspect 24. The apparatus of any one of aspects 21 to 23 further comprising:

a second heat exchanger (318, 320) having a first inlet operatively disposed to receive the reformate (25) from the outlet of the shift reactor (303) and a first outlet to discharge the reformate (25) from the second heat exchanger (318, 320), a second inlet operatively disposed to receive a feed (376) to the second heat exchanger (318, 320) and a second outlet for discharging an effluent (377) from the second heat exchanger (318, 320), wherein the first heat exchanger (322) is operatively disposed to receive a portion of the effluent (377) from the second heat exchanger as the feed (347) to the first heat exchanger (322), and wherein the plurality of heat exchangers comprise the second heat exchanger (318, 320).

Aspect 25. The apparatus of aspect 24 wherein the second heat exchanger (318) is a low pressure boiler.

Aspect 26. The apparatus of aspect 24 or aspect 25 further comprising:

a third heat exchanger (316) for heating an imported water (400) by indirect heat transfer with the reformate (25), the third heat exchanger (316) having a first inlet operatively disposed to receive the reformate (25) from the first outlet of the second heat exchanger (318, 320) and a first outlet to discharge the reformate (25) from the third heat exchanger (316), a second inlet operatively disposed to receive the imported water (400) and a second outlet to discharge the imported water (400), wherein the plurality of heat exchangers comprise the third heat exchanger.

Aspect 27. The apparatus of any one of aspects 24 to 26 further comprising:

a fourth heat exchanger (311) for heating a hydrocarbon feedstock (75) by indirect heat transfer with the reformate (25), the fourth heat exchanger (311) having a first inlet operatively disposed to receive the reformate (25) from the outlet of the shift reactor (303) and a first outlet to discharge the reformate (25) from the fourth heat exchanger (311), a second inlet operatively disposed to receive the hydrocarbon feedstock (75) and a second outlet to discharge the hydrocarbon feedstock (75), wherein the plurality of heat exchangers comprise the fourth heat exchanger.

Aspect 28. The apparatus of aspect 27, further comprising:

a fifth heat exchanger (314) for heating a steam drum feed (220) by indirect heat transfer with the reformate (25), the fifth heat exchanger (314) having a first inlet operatively disposed to receive the reformate (25) from the first outlet of the fourth heat exchanger (311) and a first outlet to discharge the reformate (25) from the fifth heat exchanger, a second inlet operatively disposed to receive the steam drum feed (220) and a second outlet to discharge the steam drum feed (220), wherein the plurality of heat exchangers comprise the fifth heat exchanger (314).

Aspect 29. The apparatus of aspect 28 further comprising:
a sixth heat exchanger (312) for heating the hydrocarbon feedstock (75) by indirect heat transfer with the reformate (25), the sixth heat exchanger (312) having a first inlet operatively disposed to receive the reformate (25) from the first outlet of the fifth heat exchanger (314) and a first outlet to discharge the reformate (25) from the sixth heat exchanger (312), a second inlet operatively disposed to receive the hydrocarbon feedstock (75) and a second outlet to discharge the hydrocarbon feedstock (75), wherein the second inlet of the fourth heat exchanger (311) is operatively disposed to receive the hydrocarbon feedstock (75) from the second outlet of the sixth heat exchanger (312), and wherein the plurality of heat exchangers comprise the sixth heat exchanger (312).

Aspect 30. The apparatus of any one of aspects 24 to 29 further comprising:

a heat exchanger (214) for heating combustion air (99) by indirect heat transfer with boiler feed water to the heat exchanger (214) for heating combustion air (99), the heat exchanger for heating combustion air having a first inlet operatively disposed to receive the boiler feed water and a first outlet to discharge a water effluent (215) from the heat exchanger (214) for heating combustion air (99), a second inlet operatively disposed to receive the combustion air (99) and a second outlet to discharge the combustion air (99), wherein the second inlet of the second heat exchanger (320) is operatively disposed to receive the water effluent (215) from the heat exchanger (214) for heating combustion air (99).

Aspect 31. The apparatus of any one of aspects 24 to 29 further comprising:

a heat exchanger (515) for heating the by-product gas (82) by indirect heat transfer with boiler feed water to the heat exchanger (515) for heating the by-product gas (82), the heat exchanger for heating the by-product gas (82) having a first inlet operatively disposed to receive the boiler feed water and a first outlet to discharge a water effluent (516) from the heat exchanger (515) for heating the by-product gas (82), a second inlet operatively disposed to receive the by-product gas (82) from the pressure swing adsorption unit (501) and a second outlet to discharge the by-product gas (82), wherein the second inlet of the second heat exchanger (320) is operatively disposed to receive the water effluent (516) from the heat exchanger (515) for heating the by-product gas (82).

Aspect 32. The apparatus of any one of aspects 24 to 31 wherein the second heat exchanger (320) is operatively disposed to receive at least a portion (241) of the water condensate (240) from the separator (321).

DETAILED DESCRIPTION OF THE PREFERRED EMBODIMENTS

Figure 1:
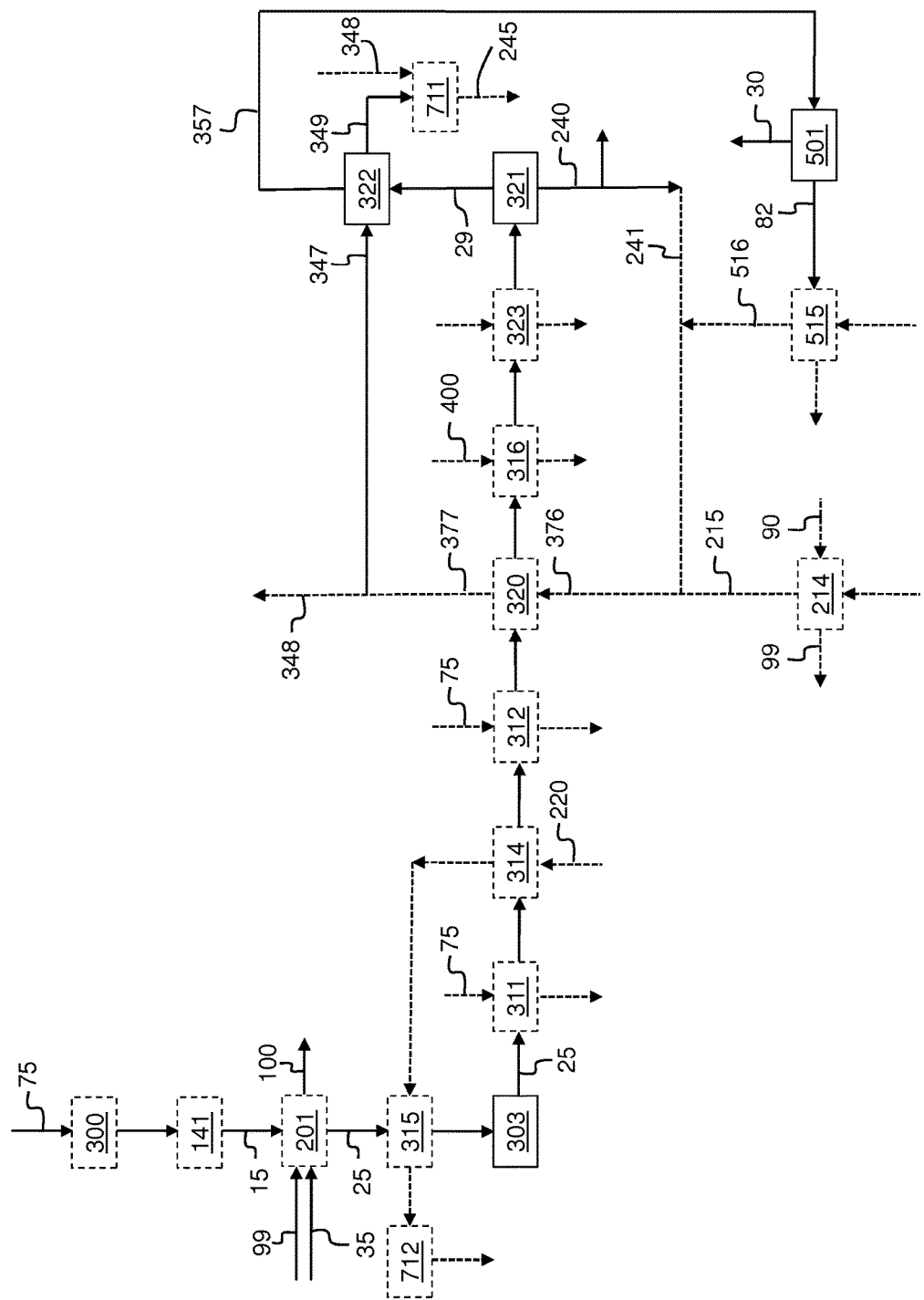
FIG. 1 is a block flow diagram for a hydrogen production facility exemplifying the present apparatus and suitable for carrying out the present process.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention, it being understood that various changes may be made in the function and arrangement of elements without departing from scope of the invention as defined by the claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The term "and/or" placed between a first entity and a second entity includes any of the meanings of (1) only the first entity, (2) only the second entity, and (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The phrase "at least one of" preceding a list of features or entities means one or more of the features or entities in the list of entities, but not necessarily including at least one of each and every entity specifically listed within the list of entities and not excluding any combinations of entities in the list of entities. For example, "at least one of A, B, or C" (or equivalently "at least one of A, B, and C" or equivalently "at least one of A, B, and/or C") has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The term "plurality" means "two or more than two."

The phrase "at least a portion" means "a portion or all." The at least a portion of a stream may have the same composition with the same concentration of each of the species as the stream from which it is derived. The at least a portion of a stream may have a different concentration of species than that of the stream from which it is derived. The at least a portion of a stream may include only specific species of the stream from which it is derived.

As used herein, pressure is absolute pressure (not gauge pressure), unless explicitly stated otherwise.

As used herein a "divided portion" of a stream is a portion having the same chemical composition and species concentrations as the stream from which it was taken.

As used herein a "separated portion" of a stream is a portion having a different chemical composition and different species concentrations than the stream from which it was taken.

As used herein, "first," "second," "third," etc. are used to distinguish from among a plurality of steps and/or features, and is not indicative of the total number, or relative position in time and/or space unless expressly stated as such.

The term "depleted" means having a lesser mole % concentration of the indicated component than the original stream from which it was formed. "Depleted" does not mean that the stream is completely lacking the indicated component.

The terms "rich" or "enriched" means having a greater mole % concentration of the indicated component than the original stream from which it was formed.

As used herein, "heat" and "heating" may include both sensible and latent heat and heating.

As used herein, "indirect heat transfer" is heat transfer from one stream to another stream where the streams are not mixed together. Indirect heat transfer includes, for example, transfer of heat from a first fluid to a second fluid in a heat exchanger where the fluids are separated by plates or tubes. Indirect heat transfer includes transfer of heat from a first fluid to a second fluid where an intermediate working fluid is used to carry the heat from the first fluid to the second fluid. The first fluid may evaporate a working fluid, e.g. water to steam, in an evaporator, the working fluid passed to another heat exchanger or condenser, where the working fluid transfers heat to the second fluid. Indirect heat transfer from the first fluid to a second fluid using a working fluid may be accommodated using a heat pipe, thermosyphon, kettle boiler, or the like.

As used herein, "direct heat transfer" is heat transfer from one stream to another stream where the streams are intimately mixed together. Direct heat transfer includes, for example, humidification where water is sprayed directly into a hot air stream and the heat from the air evaporates the water resulting in a cooler air stream.

Illustrative embodiments of the invention are described below. While the invention is susceptible to various modifications and alternative forms, specific embodiments thereof have been shown by way of example in the drawings and are herein described in detail. It should be understood, however that the description herein of specific embodiments is not intended to limit the invention to the particular forms disclosed, but on the contrary, the invention is to cover all modifications, equivalents, and alternatives falling within the scope of the invention as defined by the appended claims.

For the purposes of simplicity and clarity, detailed descriptions of well-known devices, circuits, and methods are omitted so as not to obscure the description of the present invention with unnecessary detail.

The present invention relates to a process and apparatus for producing a hydrogen-containing product gas. The hydrogen-containing product gas may be industrial grade hydrogen. The hydrogen-containing product gas may be at least 96 volume % hydrogen or at least 99 volume % hydrogen.

The process and apparatus may utilize catalytic steam-hydrocarbon reforming. Catalytic steam-hydrocarbon reforming, also called steam methane reforming (SMR), catalytic steam reforming, or steam reforming, is defined as any process used to convert reformer feedstock into reformate by reaction with steam over a catalyst. Reformate, also called synthesis gas, or simply syngas, as used herein is any mixture comprising hydrogen and carbon monoxide. The reforming reaction is an endothermic reaction and may be described generally as $C_nH_m + n\ H_2O \rightarrow n\ CO + (m/2+n)\ H_2$. Hydrogen is generated when reformate is generated.

Figure 2:
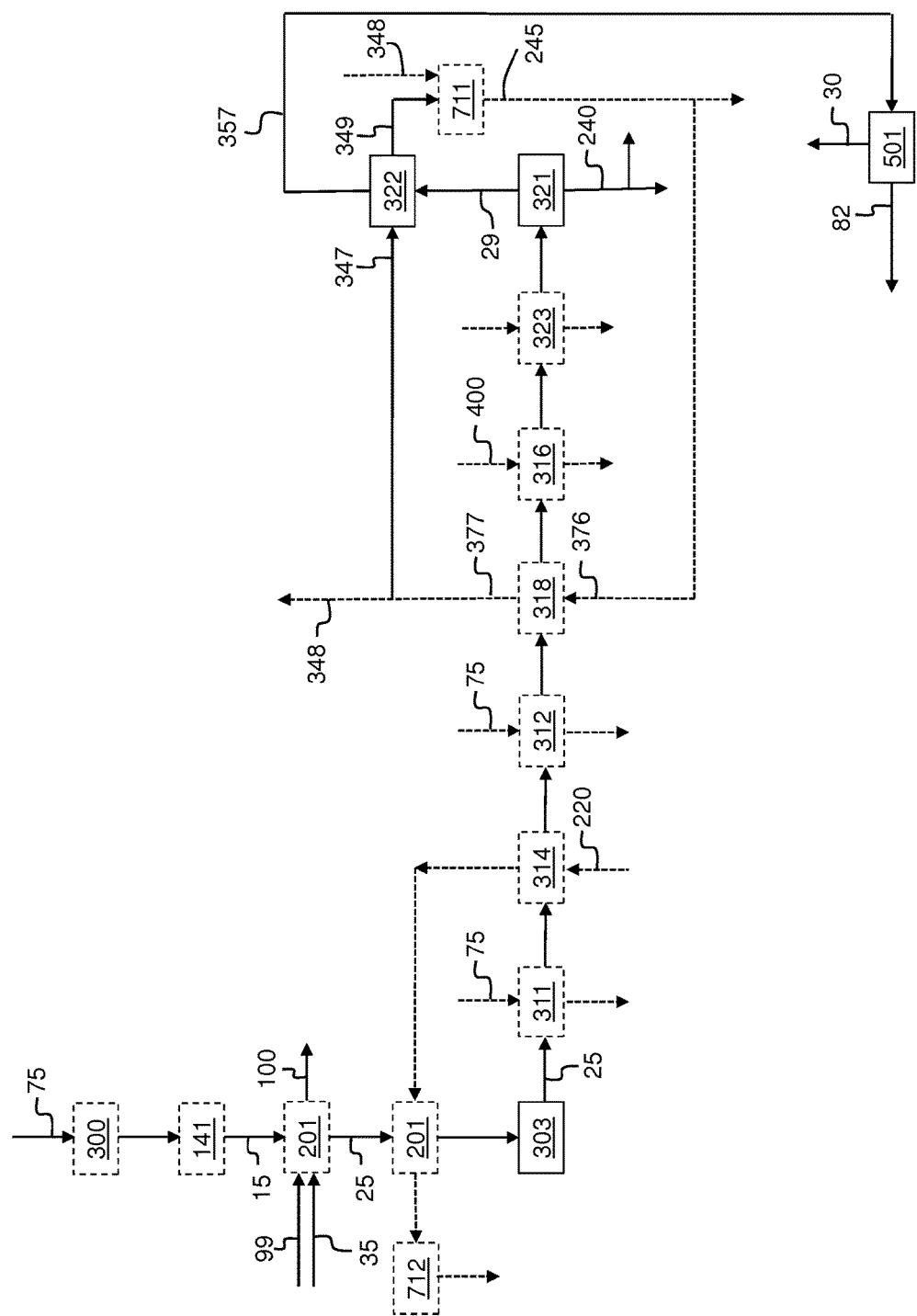
FIG. 2 is a block flow diagram for a hydrogen production facility exemplifying the present apparatus and suitable for carrying out the present process.

The process is described with reference to FIG. 1 and FIG. 2 showing block flow diagrams for catalytic steam-hydrocarbon reforming processes suitable for carrying out the present process.

The present process is particularly concerned with impeding corrosion of piping 357 that operatively connects the separator 321 and the pressure swing adsorption unit 501 as well as inlet manifolds and piping directly associated with the pressure swing adsorption unit 501.

The process comprises passing a reformate 25 from shift reactor 303 to separator 321 via a plurality of heat exchangers. The reformate is used to heat other process streams and is itself cooled in the plurality of heat exchangers. In FIG. 1, the reformate is shown to pass through heat exchangers 311, 314, 312, 320, 316 and 323. In FIG. 2, the reformate is shown to pass through heat exchangers 311, 314, 312, 318, 316 and 323. In heat exchanger 323, a so-called a trim cooler, the reformate may be cooled using cooling water which is circulated to a water cooling tower (not shown). In colder environments, the reformate may be cooled by air in heat exchanger 323. As a result of passing through the heat exchangers, water in the reformate is condensed. The cooled stream is passed to the separator 321 in order to separate water condensate 240 from a water-depleted reformate 29. Separator 321 may be any suitable vapor-liquid separator, for example, a so-called knock-out drum or knock-out pot.

Water condensate 240 is withdrawn from separator 321 and the water-depleted reformate 29 is withdrawn from the separator 321 severally from the water condensate 240.

The process comprises heating the water-depleted reformate 29 that is withdrawn from separator 321. The water-depleted reformate 29 withdrawn from separator 321 may be heated to at least 3 degrees Celsius or at least 5 degrees above the dewpoint temperature of the water-depleted reformate 29. Because the superheat only needs to overcome any condensation risk, only a small amount of heat duty is required. Then the water-depleted reformate 29 withdrawn from the separator 321 may be heated less than 20 degrees Celsius or less than 15 degrees Celsius above the dewpoint temperature of the water-depleted reformate 29.

The dewpoint temperature or dew point is the temperature at which the water vapor in the reformate will start to condense out of the gaseous phase at the pressure of the reformate.

At least a portion of the water-depleted reformate 29 that was heated is passed to pressure swing adsorption unit 501 to form hydrogen-containing product gas 30 and a pressure swing adsorption unit by-product gas 82 from the at least a portion of the water-depleted reformate 29.

By heating the water-depleted reformate 29 above the dewpoint temperature, no liquid water will exist in the piping between the separator 321 and the pressure swing adsorption unit 501. Eliminating liquid water has been found to impede corrosion of this piping.

At least a portion of the piping 357 between the separator 321 and the pressure swing adsorption unit 501 may be thermally insulated to maintain the water-depleted reformate 29 above the dewpoint temperature. All of the piping 357 between the separator 321 and the pressure swing adsorption unit 501 may be thermally insulated to maintain the water-depleted reformate 29 above the dewpoint temperature. Thermally insulating the piping 357 between the separator 321 and the pressure swing adsorption unit 501 may be particularly important for operations in cold climates.

To further impede corrosion, post weld heat treating may also be performed.

The hydrogen-containing product gas 30 may be formed from at least a portion of the water-depleted reformate 29 in a pressure swing adsorption unit 501. A pressure swing adsorption unit feed comprising at least a portion of the water-depleted reformate 29 may be separated by adsorption in the pressure swing adsorption unit 501 to form the hydrogen-containing product gas 30 and a pressure swing adsorption unit by-product gas 82, also called PSA tail gas, and PSA purge gas. Pressure swing adsorption units are well-known. Any suitable pressure swing adsorption unit may be used in the present process.

The pressure swing adsorption unit 501 may be operated using any known pressure swing adsorption cycle. Pressure swing adsorption cycles are well-known in the art and the various steps are described for example in U.S. Pat. Appl. Pub. No. 2014/0373713, incorporated herein by reference. Specific pressure swing adsorption cycles are provided in companion articles "Pressure Swing Adsorption cycles for 4 to 7 adsorption beds," IP.com number 000241449, Apr. 29, 2015, and "Pressure Swing Adsorption cycles for 7 or more adsorption beds," IP.com number 000241619, May 18, 2015.

Water-depleted reformate 29 may be heated in heat exchanger 322 by indirect heat transfer with a feed 347 to the heat exchanger 322 comprising boiler feed water, steam, or a mixture thereof.

The design of heat exchanger 322 may be a shell and tube heat exchanger where the water-depleted reformate 29 is on the shell side. The heat exchanger 322 may be directly mounted on the separator 321 to minimize the distance of piping exposed to saturated water-depleted reformate 29.

As shown in FIG. 1 and FIG. 2, the process may comprise heating a feed 376 to heat exchanger 320 (FIG. 1) or heat exchanger 318 (FIG. 2) by indirect heat transfer with reformate 25, and withdrawing an effluent 377 from heat exchanger 320 or heat exchanger 318, the effluent 377 formed from feed 376, wherein the feed 347 to heat exchanger 322 comprises a portion of the effluent 377.

Heating feed 376 with reformate 25 after the reformate 25 has heated other streams, as shown in the FIG. 1 and FIG. 2, and using only a portion of the heated effluent 377 for heating the water-depleted reformate 29, provides heat to the water-depleted reformate 29 without sacrificing energy efficiency of the process.

As shown in FIG. 1, feed 376 to heat exchanger 320 may comprise boiler feed water comprising at least a portion of one or more streams including (i) a water effluent 215 from heat exchanger 214 for heating combustion air 99, (ii) a water effluent 516 from heat exchanger 515 for heating by-product gas 82, and (iii) at least a portion 241 of water condensate 240 from separator 321.

The feed 376 to heat exchanger 320 may comprise (i) a water effluent 215 from a heat exchanger 214 for heating combustion air 99, (ii) a water effluent 516 from a heat exchanger 515 for heating the by-product gas 82 from the pressure swing adsorption unit 501, and (iii) at least a portion 241 of the water condensate 240 from the separator 321.

As shown in FIG. 2, feed 376 to heat exchanger 318 may comprise a portion of deaerated water effluent 245 from deaerator 711. Heat exchanger 318 may be a low pressure steam boiler and the effluent 377 from heat exchanger 318 may be low pressure steam having a pressure ranging from 180 kPa (absolute) to 400 kPa (absolute). Then the feed 347 to heat exchanger 322 may be low pressure steam having a pressure ranging from 180 kPa (absolute) to 400 kPa (absolute).

An effluent 349 may be withdrawn from heat exchanger 322 and passed from heat exchanger 322 to deaerator 711 to degas the boiler feed water. A steam stream may be passed to deaerator 711 to assist with degassing water streams introduced into deaerator 711. Steam for the steam stream may come from steam drum 712, low pressure steam boiler (e.g. heat exchanger 318), or other steam source.

The process may further comprise passing a second portion 348 of the effluent from heat exchanger 320 (FIG. 1) or heat exchanger 318 (FIG. 2) to deaerator 711, wherein the second portion 348 bypasses heat exchanger 322.

As used herein a deaerator is any device that removes dissolved gases from water with the assistance of steam. The steam may be introduced into the deaerator or formed in-situ. The manufacture and operation of deaerators are well-known.

The dissolved gases, which may include methanol, are removed from deaerator 711 via a vent stream. To reduce VOC emissions from the hydrogen production facility, the deaerator vent stream from deaerator 711 may be injected into the reformer furnace 201 as described in the "Report on Emission Limits for Rule 1189—Emissions from Hydrogen Plant Process Vents," South Coast Air Quality Management District, Jun. 7, 2001 (http//www3.aqmd.gov/hb/attachments/2002/020620b.doc), and "Final Environmental Assessment: Proposed Rule 1189—Emissions from Hydrogen Plant Process Vents" SCAQMD No. 1189JDN021199, South Coast Air Quality Management District Dec. 17, 1999 (http://www.aqmd.gov/docs/default-source/ceqa/documents/aqmd-projects/2000/final-ea-for-proposed-amended-rule-1189.doc?sfvrsn=4).

Deaerated boiler feed water 245 from deaerator 711 may be divided into various divided portions, and the various portions heated by reformate and/or combustion product gases to make steam and/or heat other process streams.

Heated boiler feed water can be used to heat combustion air 99 in heat exchanger 214 and/or heat pressure swing adsorption by-product gas 82 in heat exchanger 515. The portion that heats combustion air 99 in heat exchanger 214 is withdrawn as the water effluent 215 and the portion that heats the by-product gas 82 in heat exchanger 515 is withdrawn as water effluent 516.

The pressure swing adsorption unit by-product gas 82 may be heated prior to the pressure swing adsorption unit by-product gas 82 being combusted as fuel in the combustion section of the reformer furnace 201. Heating pressure swing adsorption unit by-product gas is known from U.S. Pat. No. 8,187,363, and also from earlier publications WO2007/020514A2, U.S. Pat. No. 7,377,951, and U.S. Pat. No. 7,850,944.

Boiler feed water stream from steam drum 712 may be passed to a waste heat boiler (not shown), where the boiler feed water stream is heated by indirect heat transfer with reformate 25 and form a two-phase mixture of steam and water which is returned to the steam drum 712 to make steam. High pressure steam may be withdrawn from steam drum 712 and passed to a heat exchanger in the convection section of the reformer furnace 201 to be superheated. A portion of the superheated steam may be removed from the system as export steam and another portion may be used to form the mixed feed to the reformer.

The process may further comprise heating imported water (i.e. makeup water) 400 in heat exchanger 316 by indirect heat transfer with the reformate 25. Reformate 25 may be passed to heat exchanger 320 to heat boiler feed water 347 before the reformate is passed to heat exchanger 316 to heat the imported water 400. After being heated in heat exchanger 316, the imported water 400 may be passed to deaerator 711 to be degassed using added steam as described above.

The process may further comprise heating a hydrocarbon feedstock 75 in heat exchangers 312 and 311 by indirect heat transfer with the reformate 25. The hydrocarbon feedstock 75 may first be heated in heat exchanger 312 and then heated in heat exchanger 311. The reformate 25 may be passed from shift reactor 303 to heat exchanger 311 to heat the hydrocarbon feedstock in heat exchanger 311 before the reformate is passed to heat exchanger 314 to heat the steam drum feed 220 and then passed to heat exchanger 312 to heat the hydrocarbon feedstock 75.

As shown in FIG. 1 and FIG. 2, reformate 25 may then be subsequently passed to heat exchanger 320 or 318, passed to heat exchanger 316 to heat the imported water 400, passed to heat exchanger (trim cooler) 323 to condense water from the reformate, and passed to separator 321.

To form the reformate 25, the process may utilize catalytic steam-hydrocarbon reforming.

In a process using catalytic steam-hydrocarbon reforming, a reformer feed gas mixture 15 is introduced into a plurality of catalyst-containing reformer tubes in reformer furnace 201. The reformer feed gas mixture 15 is reacted in a reforming reaction under reaction conditions effective to form a reformate 25 comprising $H_2$, $CO$, $CH_4$, and $H_2O$, and the reformate 25 is withdrawn from the plurality of catalyst-containing reformer tubes.

The reformer feed gas mixture 15 may be any feed gas mixture suitable for introducing into a catalytic steam-hydrocarbon reformer for forming a reformate. The reformer feed gas mixture 15 comprises at least one hydrocarbon and steam. The at least one hydrocarbon may be methane. The reformer feed gas mixture 15 is formed from a hydrocarbon feedstock 75 and steam. The reformer feed may be hydrogenated in a hydrogenation unit and/or desulphurized in a hydrodesulphurization unit with hydrogen added. Hydrogenation and hydrodesulphurization may be done in a combination unit 300 or separate units. Hydrogen may be provided from the hydrogen-containing product gas 30.

The reformer feed gas mixture 15 may be preformed; formed by reacting the hydrocarbon feedstock 75 and steam in a preformer 141. The hydrocarbon feedstock 75 may be formed from a hydrocarbon feed, which may be natural gas, methane, naphtha, propane, refinery fuel gas, refinery off-gas, other suitable hydrocarbon feed known in the art, or combinations thereof.

The reforming reaction takes place inside the plurality of catalyst-containing reformer tubes in reformer furnace 201. A reformer furnace, also called a catalytic steam reformer, steam methane reformer, and steam-hydrocarbon reformer, is defined herein as any fired furnace used to convert feedstock containing elemental hydrogen and carbon into reformate by a reaction with steam over a catalyst with heat provided by combustion of a fuel.

Reformer furnaces with a plurality of catalyst-containing reformer tubes, i.e. tubular reformers, are well-known in the art. Any suitable number of catalyst-containing reformer tubes may be used. Suitable materials and methods of construction are known. Catalyst in the catalyst-containing reformer tubes may be any suitable catalyst known in the art, for example, a supported catalyst comprising nickel.

The reaction conditions effective to form the reformate 25 in the plurality of catalyst-containing reformer tubes may comprise a temperature ranging from 500° C. to 1000° C. and a pressure ranging from 203 kPa to 5,066 kPa (absolute). The reaction condition temperature may be as measured by any suitable temperature sensor, for example a type R thermocouple. The reaction condition pressure may be as measured by any suitable pressure sensor known in the art, for example a pressure gauge as available from Mensor.

The process comprises combusting a fuel 35 with an oxidant gas 99 in a combustion section of the reformer furnace 201 external to the plurality of catalyst-containing reformer tubes. The fuel is combusted under conditions effective to combust the fuel to form a combustion product gas 100 comprising $CO_2$ and $H_2O$ and generate heat to supply energy for reacting the reformer feed gas mixture 15 inside the plurality of catalyst-containing reformer tubes. The combustion product gas 100 is then withdrawn from the combustion section of the reformer furnace 201.

Any suitable burner may be used to introduce the fuel 35 and the oxidant gas 99 into the combustion section 203. Combustion of the fuel 35 with the oxidant gas 99 generates heat to supply energy for reacting the reformer feed gas mixture 15 inside the plurality of catalyst-containing reformer tubes. The combustion product gas 100 is withdrawn from the combustion section of the reformer furnace 201 and passed to the convection section of the reformer furnace 201 to supply heat to other process streams. The combustion section (also called the radiant, radiation, or radiative section) of the reformer furnace is that part of the reformer furnace containing the plurality of catalyst-containing reformer tubes. The convection section of the reformer furnace is that part of the reformer furnace containing heat exchangers other than the plurality of catalyst-containing reformer tubes. The heat exchangers in the convection section may be for heating process fluids other than reformate from the plurality of catalyst-containing reformer tubes, such as water/steam, air, pressure swing adsorption unit by-product gas, reformer feed gas mixture prior to introduction into the catalyst-containing reformer tubes, preformed reformer feed gas, etc. The convection section may also, if desired, contain a convective preformer.

Furnace conditions effective to combust the fuel may comprise a furnace temperature ranging from 600° C. to 1500° C. and a pressure ranging from 98 kPa to 101.4 kPa (absolute). Actual flame temperatures are generally higher. The temperature may be as measured by a thermocouple, an optical pyrometer, or any other calibrated temperature measurement device known in the art for measuring furnace temperatures. The pressure may be as measured by any suitable pressure sensor known in the art, for example a pressure gauge as available from Mensor.

The fuel 35 may be formed from a by-product gas 82 from a pressure swing adsorption unit 501 and a supplemental fuel. By-product gas from a pressure swing adsorption unit is often called pressure swing adsorber tail gas, and supplemental fuel is often called trim fuel. The by-product gas 82 and supplemental fuel may be heated before being used as fuel. By-product gas 82 and supplemental fuel may be blended and introduced together through a burner to the combustion section, or they may be introduced separately through different ports in the burner. Alternatively, the by-product gas 82 may be introduced through the primary burner and the supplemental fuel may be introduced through lances near the burner.

The oxidant gas 99 is a gas containing oxygen and may be air, oxygen-enriched air, oxygen-depleted air such as gas turbine exhaust, industrial grade oxygen, or any other oxygen-containing gas known for use in a reformer furnace for combustion. For example, as shown in FIG. 1 and FIG. 2, air 90 may be compressed in forced draft fan (not shown), heated in heat exchanger 214, and passed to the reformer furnace 201 as oxidant gas 99. Heated air from heat exchanger 214 may be further heated in the convection section of the reformer furnace 201 if desired.

Combustion product gas 100 may heat a number of different process streams in the convection section of the reformer furnace 201. The combustion product gas 100 may heat the streams in various different configurations (order of heating).

The combustion product gas 100 may heat the feed to a preformer 141, the reformer feed gas mixture 15, steam to form superheated steam, and boiler feed water.

The reformate 25 may be passed from the plurality of catalyst-containing reformer tubes to shift reactor 303. The reformate 25 may exchange heat with a number of streams before being passed to the shift reactor 303. For example, the reformate 25 withdrawn from the plurality of catalyst-containing reformer tubes may be passed to a so-called waste heat boiler where the reformate 25 heats boiler feed thereby forming a two-phase water and steam stream that is introduced into a steam drum.

In the shift reactor 303, the reformate 25 is reacted in the presence of a shift catalyst under reaction conditions sufficient to shift the reformate 25 to form additional $H_2$ in the reformate 25. Additional hydrogen gas may be obtained by the catalytic reaction of carbon monoxide and steam. This reaction is exothermic and is commonly referred to as the water-gas shift reaction or shift reaction: $CO+H_2O \rightarrow CO_2+H_2$. The reaction is affected by passing carbon monoxide and water through a bed of a suitable catalyst. The reaction conditions effective to form additional hydrogen in the reformate 25 may comprise a second temperature ranging from 190° C. to 500° C. and a second pressure ranging from 203 kPa to 5,066 kPa (absolute).

Any suitable shift catalyst may be used. The shift reactor may be a so-called high temperature shift (HTS), low temperature shift (LTS), medium temperature shift (MTS), or combination. One or more shift reactors may be used.

For high temperature shift, an inlet temperature in the range 310° C. to 370° C., and an outlet temperature in the range 400° C. to 500° C. are typical. Usually an iron oxide/chromia catalyst is used for high temperature shift. High temperature shift may be preferred for the present process.

For low temperature shift, an inlet temperature in the range 190° C. to 230° C., and an outlet temperature in the range 220° C. to 250° C. are typical. Usually a catalyst comprising metallic copper, zinc oxide, and one or more other difficulty reducible oxides such as alumina or chromia is used for low temperature shift For medium temperature shift, an inlet temperature in the range 190° C. to 230° C. and an outlet temperature of up to 350° C. are typical. A suitably formulated supported copper catalyst can be used for medium temperature shift.

A combination may include a sequence of high temperature shift, cooling by indirect heat exchange, and low temperature shift. If desired, either shift stage can be subdivided with interbed cooling.

The apparatus is briefly described with reference to FIG. 1 and FIG. 2 showing block flow diagrams for catalytic steam-hydrocarbon reforming apparatus. The construct of the apparatus should be clear from FIG. 1 and FIG. 2 along with the description of the process.

The apparatus comprises a shift reactor 303, a separator 321, a plurality of heat exchangers operatively connecting the shift reactor 303 to the separator 321, a pressure swing adsorption unit 501 operatively disposed to receive a water-depleted reformate from the separator 321, and a heat exchanger 322 operatively disposed between the separator 321 and the pressure swing adsorption unit 501 for heating the water-depleted reformate from the separator 321.

The apparatus may comprise heat exchanger 320 (FIG. 1) or heat exchanger 318 (FIG. 2) which is operatively disposed to heat the feed 376 by indirect heat transfer with reformate 25 and discharge an effluent 377, of which a portion is feed 347 to heat exchanger 322. Heat exchanger 318 may be a low pressure boiler.

The plurality of heat exchangers may include heat exchanger 316 for heating imported water (makeup water) 400 by indirect heat transfer with reformate 25, heat exchanger 311 and heat exchanger 312 for heating hydrocarbon feedstock 75 by indirect heat transfer with reformate 25, and heat exchanger 314 for heating a steam drum feed 220 by indirect heat transfer with reformate 25.

The apparatus may also comprise heat exchanger 214 for heating combustion air 99 by indirect heat transfer with boiler feed water and heat exchanger 515 for heating by-product gas 82 from the pressure swing adsorption unit 501 by indirect heat transfer with boiler feed water. Heat exchanger 320 (FIG. 1) may be operatively disposed to receive boiler feed water effluent from heat exchanger 214 and/or boiler feed water effluent from heat exchanger 515 and/or a portion 241 of the water condensate 240 from separator 321.

Example 1

Aspen Plus® by Aspen Technology, Inc. was used to simulate the present process and comparative processes. Typical conditions for commercial catalytic steam-hydrocarbon reforming are used, such as natural gas feedstock, and steam-to-carbon ratio. The process is simulated for a case with preformer 141 and medium temperature shift reactor 303.

A process according to the invention and a comparative process were simulated using the same input parameters. The process according to the invention for example 1 that was simulated is shown in FIG. 1 and includes a waste heat boiler (not shown) between the reformer and heat exchanger 315, and all of heat exchangers 315, 311, 314, 312, 320, 316, 323, 214 and 515. The comparative process that was simulated is the same as the inventive process but without heat exchanger 322. In the inventive process a small portion of the effluent 377 is passed to heat exchanger 322 to heat the water depleted reformate. A larger portion 348 of effluent 377 is passed to the deaerator 711. For the comparative case all of the effluent 377 is passed to deaerator 711 as stream 348.

The thermal energy consumption for hydrogen production for various processes can be compared using the net specific energy (NSE) having units J/Nm$^3$, which can be defined $$NSE = \frac{HHV_{fuel} * F_{fuel} + HHV_{feed} + F_{feed} - \Delta H * F_{steam}}{HPR},$$

where
$HHV_{fuel}$ is the higher heating value of the supplemental fuel introduced into the combustion section (J/Nm$^3$),
$F_{fuel}$ is the flow rate of the fuel (Nm$^3$/h),
$HHV_{feed}$ is the higher heating value of the reformer feedstock introduced into the reformer (J/Nm$^3$),
$F_{feed}$ is the flow rate of the reformer feedstock (Nm$^3$/h),
$\Delta H$ is the enthalpy difference between the export steam and water at 25° C. (J/kg),
$F_{steam}$ is the mass flow of the export steam (kg/h), and
HPR is the hydrogen production rate (Nm$^3$/h).

The net specific energy for the present process shown in FIG. 1 is 0.06% less than the comparative process, but the comparative process is more susceptible to corrosion in the piping between the knock-out drum and the pressure swing adsorption unit.

Example 2

A process according to the invention and a comparative process were simulated using the same input parameters in example 2. The process according to the invention for example 2 that was simulated is shown in FIG. 2 and includes a waste heat boiler (not shown) between the reformer and heat exchanger 315, and all of heat exchangers 315, 311, 314, 312, 318, 316, and 323. The comparative process that was simulated is the same as the inventive process but without heat exchanger 322. In the inventive process a portion of the effluent 377 is passed to heat exchanger 322 to heat the water depleted reformate. Another portion 348 of effluent 377 is passed to the deaerator 711. For the comparative case all of the effluent 377 is passed to deaerator 711 as stream 348.

The net specific energy for the present process shown in FIG. 2 is 0.3% less than the comparative process, but the comparative process is more susceptible to corrosion in the piping between the knock-out drum and the pressure swing adsorption unit.

We claim:

1. A process for producing a hydrogen-containing product gas while impeding corrosion of piping operatively connecting a separator and a pressure swing adsorption unit, the process comprising:
passing a reformate from a shift reactor to the separator via a plurality of heat exchangers, the plurality of heat exchangers operatively disposed between the shift reactor and the separator, thereby condensing water in the reformate to form a water condensate and a water-depleted reformate in the separator;
withdrawing the water condensate from the separator;
withdrawing the water-depleted reformate from the separator;
heating the water-depleted reformate withdrawn from the separator; and
passing at least a portion of the water-depleted reformate that was heated to the pressure swing adsorption unit to form the hydrogen-containing product gas and a by-product gas from the at least a portion of the water-depleted reformate.

2. The process of claim 1 wherein the water-depleted reformate withdrawn from the separator is heated to at least 3 degrees Celsius above the dewpoint temperature of the water-depleted reformate.

3. The process of claim 1 further comprising thermally insulating at least a portion of the piping operatively connecting the separator and the pressure swing adsorption unit.

4. The process of claim 1 wherein the water-depleted reformate is heated in a first heat exchanger by indirect heat transfer with a feed to the first heat exchanger comprising boiler feed water, steam, or a mixture thereof.

5. The process of claim 4 wherein the feed to the first heat exchanger is steam having an absolute pressure ranging from 180 kPa to 400 kPa.

6. The process of claim 4 further comprising:
withdrawing an effluent from the first heat exchanger, the effluent formed from the feed to the first heat exchanger,
passing the effluent from the first heat exchanger to a deaerator;
heating a feed to a second heat exchanger by indirect heat transfer with the reformate, wherein the plurality of heat exchangers comprise the second heat exchanger; and
withdrawing an effluent from the second heat exchanger, the effluent from the second heat exchanger formed from the feed to the second heat exchanger, wherein the feed to the first heat exchanger comprises at least a portion of the effluent from the second heat exchanger.

7. The process of claim 6 further comprising:
passing a second portion of the effluent from the second heat exchanger to the deaerator wherein the second portion bypasses the first heat exchanger.

8. The process of claim 6 wherein the second heat exchanger is a low pressure boiler and the effluent from the second heat exchanger is steam having an absolute pressure ranging from 180 kPa to 400 kPa.

9. The process of claim 6 wherein the feed to the second heat exchanger comprises a portion of a deaerated water effluent from the deaerator.

10. The process of claim 6 wherein the feed to the second heat exchanger comprises one or more of (i) at least a portion of a water effluent from a heat exchanger for heating combustion air, (ii) at least a portion of a water effluent from a heat exchanger for heating the by-product gas from the pressure swing adsorption unit, and (iii) at least a portion of the water condensate from the separator.

11. The process of claim 6 wherein the feed to the second heat exchanger comprises (i) a water effluent from a heat exchanger for heating combustion air, (ii) a water effluent from a heat exchanger for heating the by-product gas from the pressure swing adsorption unit, and (iii) at least a portion of the water condensate from the separator.

12. The process of claim 6 further comprising:
heating imported water in a third heat exchanger by indirect heat transfer with the reformate, wherein the plurality of heat exchangers comprise the third heat exchanger, and wherein the reformate heats the feed to the second heat exchanger in the second heat exchanger before the reformate heats the imported water in the third heat exchanger.

13. The process of claim 12 further comprising:
heating a hydrocarbon feedstock in a fourth heat exchanger by indirect heat transfer with the reformate, wherein the plurality of heat exchangers comprise the fourth heat exchanger, and wherein the reformate heats the hydrocarbon feedstock in the fourth heat exchanger before the reformate heats the feed to the second heat exchanger in the second heat exchanger.

14. The process of claim 13 further comprising:
heating a steam drum feed comprising a portion of a deaerated water effluent from the deaerator in a fifth heat exchanger by indirect heat transfer with the reformate, wherein the plurality of heat exchangers comprise the fifth heat exchanger, and wherein the reformate heats the stream drum feed in the fifth heat exchanger after the reformate heats the hydrocarbon feedstock in the fourth heat exchanger and before the reformate heats the feed to the second heat exchanger in the second heat exchanger; and
passing the heated steam drum feed to a steam drum.

15. The process of claim 14 further comprising:
heating the steam drum feed in a sixth heat exchanger by indirect heat transfer with the reformate, wherein the reformate heats the stream drum feed in the sixth heat exchanger before the reformate is passed to the shift reactor, and wherein the steam drum feed is heated in the fifth heat exchanger before the steam drum feed is heated in the sixth heat exchanger; and
heating a hydrocarbon feedstock in a seventh heat exchanger by indirect heat transfer with the reformate, wherein the plurality of heat exchangers comprise the seventh heat exchanger, wherein the reformate heats the hydrocarbon feedstock in the seventh heat exchanger after the reformate heats the portion of the deaerated water effluent in the fifth heat exchanger and before the reformate heats the feed to the second heat exchanger in the second heat exchanger, and/or wherein the hydrocarbon feedstock is heated in the seventh heat exchanger before the hydrocarbon feedstock is heated in the fourth heat exchanger.

16. An apparatus for producing a hydrogen-containing product gas while impeding corrosion of piping operatively connecting a separator and a pressure swing adsorption unit, the apparatus comprising:
a shift reactor having an inlet for receiving a reformate and an outlet for discharging the reformate after reacting in the shift reactor;
the separator having an inlet operatively disposed to receive the reformate from the shift reactor, an outlet for discharging a water-depleted reformate, and an outlet for discharging a water condensate;
a plurality of heat exchangers operatively disposed between the shift reactor and the separator;
the pressure swing adsorption unit having an inlet operatively disposed to receive the water-depleted reformate from the separator, an outlet for discharging the hydrogen-containing product gas, and an outlet for discharging a by-product gas; and
a first heat exchanger operatively disposed between the separator and the pressure swing adsorption unit for heating the water-depleted reformate by indirect heat transfer with a feed to the first heat exchanger.

17. The apparatus of claim 16 wherein at least a portion of the piping operatively connecting the separator and the pressure swing adsorption unit is thermally insulated.

18. The apparatus of claim 16 further comprising:
a second heat exchanger having a first inlet operatively disposed to receive the reformate from the outlet of the shift reactor and a first outlet to discharge the reformate from the second heat exchanger, a second inlet operatively disposed to receive a feed to the second heat exchanger and a second outlet for discharging an effluent from the second heat exchanger, wherein the first heat exchanger is operatively disposed to receive a portion of the effluent from the second heat exchanger as the feed to the first heat exchanger, and wherein the plurality of heat exchangers comprise the second heat exchanger.

19. The apparatus of claim 18 further comprising:
a third heat exchanger for heating an imported water by indirect heat transfer with the reformate, the third heat exchanger having a first inlet operatively disposed to receive the reformate from the first outlet of the second heat exchanger and a first outlet to discharge the reformate from the third heat exchanger, a second inlet operatively disposed to receive the imported water and a second outlet to discharge the imported water, wherein the plurality of heat exchangers comprise the third heat exchanger;
a fourth heat exchanger for heating a hydrocarbon feedstock by indirect heat transfer with the reformate, the fourth heat exchanger having a first inlet operatively disposed to receive the reformate from the outlet of the shift reactor and a first outlet to discharge the reformate from the fourth heat exchanger, a second inlet operatively disposed to receive the hydrocarbon feedstock and a second outlet to discharge the hydrocarbon feedstock, wherein the plurality of heat exchangers comprise the fourth heat exchanger;
a fifth heat exchanger for heating a steam drum feed by indirect heat transfer with the reformate, the fifth heat exchanger having a first inlet operatively disposed to receive the reformate from the first outlet of the fourth heat exchanger and a first outlet to discharge the reformate from the fifth heat exchanger, a second inlet operatively disposed to receive the steam drum feed and a second outlet to discharge the steam drum feed, wherein the plurality of heat exchangers comprise the fifth heat exchanger; and
a sixth heat exchanger for heating the hydrocarbon feedstock by indirect heat transfer with the reformate, the sixth heat exchanger having a first inlet operatively disposed to receive the reformate from the first outlet of the fifth heat exchanger and a first outlet to discharge the reformate from the sixth heat exchanger, a second inlet operatively disposed to receive the hydrocarbon feedstock and a second outlet to discharge the hydrocarbon feedstock, wherein the second inlet of the fourth heat exchanger is operatively disposed to receive the hydrocarbon feedstock from the second outlet of the sixth heat exchanger, and wherein the plurality of heat exchangers comprise the sixth heat exchanger.

20. The apparatus of claim 18 further comprising:
a heat exchanger for heating combustion air by indirect heat transfer with boiler feed water to the heat exchanger for heating combustion air, the heat exchanger for heating combustion air having a first inlet operatively disposed to receive the boiler feed water and a first outlet to discharge a water effluent from the heat exchanger for heating combustion air, a second inlet operatively disposed to receive the combustion air and a second outlet to discharge the combustion air, wherein the second inlet of the second heat exchanger is operatively disposed to receive the water effluent from the heat exchanger for heating combustion air; and a heat exchanger for heating the by-product gas by indirect heat transfer with boiler feed water to the heat exchanger for heating the by-product gas, the heat exchanger for heating the by-product gas having a first inlet operatively disposed to receive the boiler feed water and a first outlet to discharge a water effluent from the heat exchanger for heating the by-product gas, a second inlet operatively disposed to receive the by-product gas from the pressure swing adsorption unit and a second outlet to discharge the by-product gas, wherein the second inlet of the second heat exchanger is operatively disposed to receive the water effluent from the heat exchanger for heating the by-product gas;

wherein the second heat exchanger is operatively disposed to receive at least a portion of the water condensate from the separator.

\* \* \* \* \*